Oct. 22, 1968    R. W. DOERNER    3,406,449
INTERNAL PIPE CUTTER WITH SCREW-THREADED ADJUSTMENT MEANS
Filed July 31, 1967
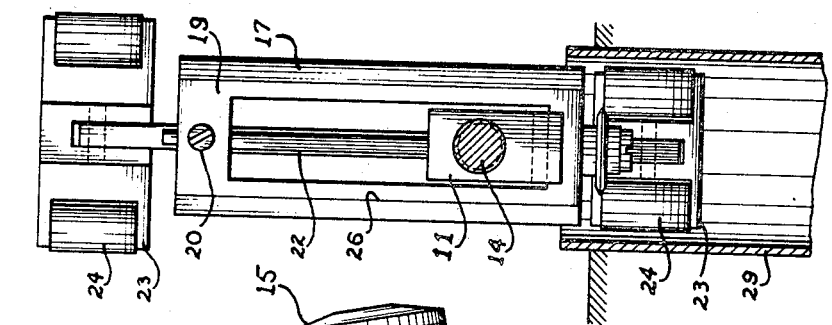
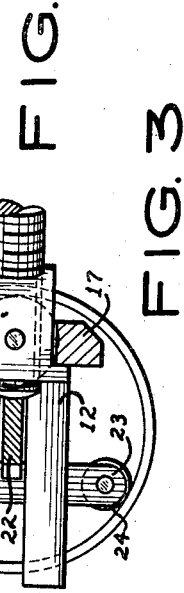
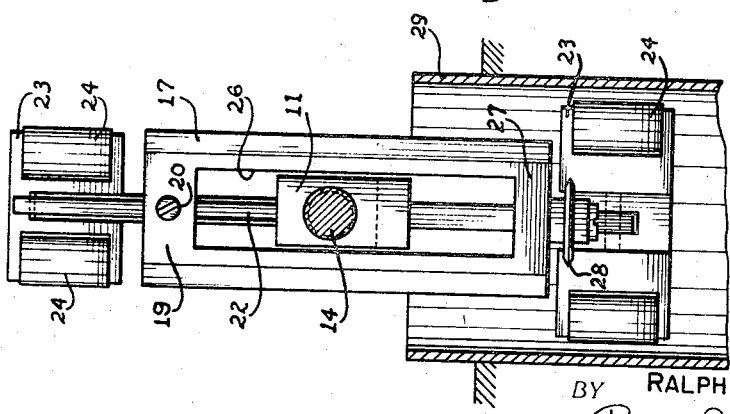
INVENTOR.
BY   RALPH W. DOERNER
ATTORNEYS 3,406,449
INTERNAL PIPE CUTTER WITH SCREW-
THREADED ADJUSTMENT MEANS
Ralph W. Doerner, 516 Oak St.,
Boonton, N.J. 07005
Filed July 31, 1967, Ser. No. 657,236
5 Claims. (Cl. 30—107)

ABSTRACT OF THE DISCLOSURE

My invention relates to pipe cutters generally and specifically to an internal pipe cutter adjustable with respect to both the depth of cut and the diameter of the pipe and which may be easily operated by an elongated handle from without the pipe.

Field of invention

The field of my invention is pipe cutters and specifically those pipe cutters which are adapted to cut pipes, particularly protruding pipes, from within rather than from without. Presently, pipes which protrude beyond a fixed surface such as a floor or wall are finish cut by means of a hammer and chisel. This procedure is not only difficult and time consuming but does not lend itself to a dimensionally accurate nor clean cut.

Internal pipe cutters are known but basically lack critical adjustability with respect to both depth of cut and the diameter of the pipe while maintaining an even pressure throughout a cutting turn.

Therefore, it is among the objects and advantages of my invention to provide an internal pipe cutter which is adjustable both with respect to the depth of cut and to the diameter of the pipe.

Another object of my invention is to provide an internal pipe cutter which evenly and accurately distributes pressure within the pipe and accurately positions the cutting tool throughout the cutting circle.

Still a further object of my invention is to provide an internal pipe cutter wherein extremely great cutting pressures may be generated continuously with the mere turning of a handle by which the pipe cutter is actuated.

Internal pipe cutters generally of the character disclosed in this application may be located in the U.S. Patent Office, Class 30, sub-classes 92, 103 to 108 inclusive. The following U.S. Letters Patent are broadly related to my invention but do not anticipate the same: 764,637, 872,290, 1,457,258, 2,572,611, 2,728,137, 2,- 802,262.

Summary of invention

By way of summary, my internal pipe cutter comprises a body member, having a threaded bore extending transversely therethrough; a pair of spaced apart legs on the body member; upwardly extending mounting means on top of the body member; a frame having an opening extending transversely therethrough rigidly and vertically adjustably mounted on the mounting member, the body member extending into the opening in the frame; a downwardly extending pressure bar pivotally mounted at one end to the upper portion of the frame; a pair of rollers pivotally mounted to the lower end of the pressure bar about a generally horizontal axis, the rollers being rotatable about a generally vertical axis and spaced apart an equal distance on opposite sides of the pressure bar, and an adjustment bolt threadably mounted in the bore and the body member engagable with the pressure bar.

Preferred embodiment of invention

The objects and advantages aforesaid as well as other objects and advantages may be achieved by my invention, a preferred embodiment of which is illustrated in the drawings, in which:

FIGURE 1 is a front elevational, partially cross-sectional view of my internal pipe cutter positioned within a pipe;

FIGURE 2 is a side elevational, partially cross-sectional view of the pipe cutter shown in FIGURE 1;

FIGURE 3 is a top cross-sectional view taken along line 3—3 in FIGURE 2 looking in the direction of the arrows;

FIGURE 4 is a front elevational, partially cross-sectional view of the pipe cutter shown in FIGURES 1 through 3 inclusive with the pivotal frame reversed to adapt to a pipe of substantially smaller diameter than that illustrated in FIGURES 1 through 3.

Referring now to the drawings in detail, my internal pipe cutter comprises a body member 11 having a pair of generally horizontal, spaced apart legs 12—12 formed thereon. The total width of the body member 11 and legs 12 is greater than the diameter of the largest pipe upon which my cutter would be used. The body member 11 is provided with a threaded bore 13 extending transversely therethrough and oriented at a slight angle to the horizontal. A pressure adjustment bolt 14 is threadably engaged in the bore 13 and extends transversely therethrough. The bolt 14 may be provided with a handle 15 for operation.

An upwardly extending slide-rod 16 is rigidly mounted to the top of the body member 11. An elongated generally rectangular frame 17 is slidably mounted on the slide-rod 16, the rod 16 extending through a bore 18 in the top leg 19 of the frame 17. The vertical position of the frame 17 is rigidly fixed by set screw 20.

The top leg 19 of the frame 17 is provided with a flat, horizontally extending rigid support leg 21. A downwardly extending pressure bar 22 is pivotally mounted to the support leg 21. The plane of the pressure bar lies generally in the plane of the axis of the pressure adjustment bolt 14 such that the end of the pressure bolt 14 is engageable with the pressure bar 22.

A pressure roller block 23 is pivotally mounted to each end of the pressure bar 22, each pressure block 23 being pivotal about a generally horizontal axis extending through the bar 22. The blocks 23, 23 are positioned symmetrically on opposite sides of the bar 22 and carry each a pair of spaced apart rollers 24, 24. Each of the rollers 24 is spaced equidistant from the vertical axis of the pressure bar 22 and are each rotatable about a generally vertical axis. The uppermost block 23 is dimensioned smaller than the lowermost block 23 such that the upper pair of rollers 24 are spaced apart a shorter distance than the lowermost rollers to accommodate for different size pipe diameters. A pivot bore 25 is provided in the lower portion of the pressure bar 22 such that it may be inverted so that bore 25 becomes the pivot point and the smaller block 23 is positioned within the pipe as is illustrated in FIGURE 4.

The frame 17 is provided with an elongated, generally rectangular, opening 26 extending transversely therethrough. The opening 26 is dimensioned such that the body member 11 extends therethrough. The bottom leg 27 of the frame 17 carries a rotatable pipe cutter 28.

In operation, the body member 11 with the legs 12, 12 are positioned over the top end of a pipe 29. Both the frame 17 and the pressure bar 22 depend into the pipe 29. The depth of the cut is determined by positioning the frame 17 on the slide rod 16 and tightening the set screw 20. The pressure adjustment of bolt 14 is screwed inwardly to force the pressure bar 22 to pivot on the leg 21. The bar 22 pivots until the rollers 24, 24 engage the internal wall of the pipe 29. Since the body member 11 and legs 12, 12 are loosely mounted on the top of the pipe 29, pressure between the adjustment bolt 14 and the leg 22 opposed by engagement of the rollers 24, 24 with the pipe 29 causes corresponding pressure between the cutter 28 and the inside of the pipe 29. When sufficient pressure has been established, the pressure adjustment bolt 14 is employed to rotate the body member 11 and legs 12, 12 on the top edge of the pipe 29, thereby causing the cutter 28 to traverse the internal surface of the pipe cutting the same. The pressure adjustment bolt 14 is rotated periodically as the depth of cut increases to maintain pressure. In this manner, a clean cut may be made at any given depth within the dimensional limitations of the cutter.

During the cutting process, the cutter 28 is maintained in perfect cutting position by the rollers 24, 24 which form with the cutter 28 a symmetrical triangular configuration as is illustrated in FIGURE 3.

The foregoing description is merely intended to illustrated an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. An internal pipe cutter comprising,
   (a) a body member, having a threaded bore extending transversely therethrough;
   (b) a pair of spaced apart legs on the body member;
   (c) upwardly extending mounting means on top of the body member;
   (d) a frame having an opening extending transversely therethrough rigidly and vertically adjustably mounted on the mounting member, the body member extending into the opening in the frame;
   (e) a downwardly extending pressure bar pivotally mounted at one end to the upper portion of the frame;
   (f) a pair of rollers pivotally mounted to the lower end of the pressure bar about a generally horizontal axis, the rollers being rotatable about a generally vertical axis and spaced apart an equal distance on opposite sides of the pressure bar; and
   (g) an adjustment bolt threadably mounted in the bore and the body member engageable with the pressure bar.
2. An internal pipe cutter comprising,
   (a) the structure in accordance with claim 1 and,
   (b) a leg on the upper portion on the frame extending laterally in the direction of the pressure bar,
   (c) the pressure bar being directly pivotally mounted to the leg and indirectly pivotally mounted to the frame.
3. An internal pipe cutter comprising,
   (a) the structure in accordance with claim 1, and
   (b) pairs of rollers pivotally mounted to both ends of the pressure bar, the pairs of rollers being spaced apart different distances.
4. An internal pipe cutter comprising,
   (a) the structure in accordance with claim 1 in which,
   (b) the frame is generally perpendicular to the plane of the bottom of the body member and legs.
5. An internal pipe cutter comprising,
   (a) the structure in accordance with claim 1, and
   (b) an upwardly extending slide rod rigidly mounted on the top of the body member,
   (c) the frame being slidably mounted on the slide rod.

References Cited
UNITED STATES PATENTS

| | | | |
|---|---|---|---|
| 764,637 | 8/1904 | Shackelford | 30—105 |
| 872,290 | 11/1907 | Lusk | 30—105 |
| 936,674 | 10/1909 | Skinner | 30—108 |
| 1,240,779 | 9/1917 | Powers | 30—105 |
| 1,457,258 | 5/1923 | Maher | 30—107 |
| 2,572,611 | 10/1951 | Glore et al. | 30—104 |
| 2,728,137 | 12/1955 | Elliott | 30—107 |
| 2,802,262 | 8/1957 | Wilhelm | 30—105 |

MYRON C. KRUSE, *Primary Examiner.*